US012810213B2

(12) United States Patent
Wang et al.

(10) Patent No.: US 12,810,213 B2
(45) Date of Patent: Nov. 24, 2026

(54) SYSTEMS AND METHODS FOR UPDATING MODELS FOR IMAGE PROCESSING USING FEDERATED LEARNING

(71) Applicant: Toyota Motor Engineering & Manufacturing North America, Inc., Plano, TX (US)

(72) Inventors: Chianing Wang, Mountain View, CA (US); Yiyue Chen, Austin, TX (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 1232 days.

(21) Appl. No.: 17/484,683

(22) Filed: Sep. 24, 2021

(65) Prior Publication Data

US 2023/0102233 A1 Mar. 30, 2023

(51) Int. Cl.

*G06N 3/098* (2023.01)
*G06F 18/214* (2023.01)
*G06N 20/20* (2019.01)
*H04L 67/125* (2022.01)

(52) U.S. Cl.

CPC ........... *G06N 20/20* (2019.01); *G06F 18/214* (2023.01); *H04L 67/125* (2013.01)

(58) Field of Classification Search

CPC ............................... G06N 20/20; G06N 3/098
See application file for complete search history.

(56) References Cited

U.S. PATENT DOCUMENTS

2019/0220703 A1* 7/2019 Prakash ................. G06V 10/95
2019/0340534 A1 11/2019 McMahan et al.
2020/0410288 A1* 12/2020 Capota .................. G06F 18/214
2022/0138550 A1* 5/2022 Zhang .................... G06N 3/098
706/25
2022/0400371 A1* 12/2022 Elshafie .............. H04L 25/0226
2023/0068386 A1* 3/2023 Akdeniz ................ G06N 3/084

FOREIGN PATENT DOCUMENTS

CN 111079977 A 4/2020
CN 111580970 A 8/2020
CN 111754000 A 10/2020
CN 112183764 A 1/2021
CN 113033082 A 6/2021
WO 2021064737 A1 4/2021

* cited by examiner

*Primary Examiner* — Grace Park
(74) *Attorney, Agent, or Firm* — Dinsmore & Shohl LLP

(57) ABSTRACT

A system for training a model for image processing using federated learning is provided. The system includes a controller programmed to obtain information about a computation resource in each of a plurality of edge nodes, assign training steps to the plurality of edge nodes based on the information about the computation resource, determine frequencies of uploading local model parameters for the plurality of edge nodes based on the assigned training steps, receive local model parameters from one or more of the plurality of edge nodes based on the determined frequencies, and update a global model based on the received local model parameters.

18 Claims, 9 Drawing Sheets

| Compute Type | 8vCPU | 16vCPU | 32vCPU | 1vGPU (3/7:MIG) | 1xGPU (7/7:Passthrough) |
|---|---|---|---|---|---|
| Seconds/100 Steps | 401.89 | 193.806 | 162.541 | 22.045 | 20.335 |
| Propose Steps | 50.60 | 104.92 | 125.11 | 922.43 | 100.00 |

| 101 | 103 | 105 | 107 | 109 |
|---|---|---|---|---|
| Node 1(T4) | Node 2(P100) | Node 3(V100) | Node 4(T4) | Node 5(P100) |
| 350 | 600 | 1000 | 350 | 600 |
| 700 | 1200 | 2000 | 700 | 1200 |
| 1050 | 1800 | 3000 | 1050 | 1800 |
| 1400 | 2400 | 4000 | 1400 | 2400 |
| 1750 | 3000 | 5000 | 1750 | 3000 |
| 2100 | 3600 | 6000 | 2100 | 3600 |
| 2450 | 4200 | 7000 | 2450 | 4200 |
| 2800 | 4800 | 8000 | 2800 | 4800 |
| 3150 | 5400 | 9000 | 3150 | 5400 |

FIG. 8

| Scheme (A total of 9000 training steps for V100, each node communicates after 1000 local training steps) | mAP | Total average time (sec) | Total training time (sec) |
|---|---|---|---|
| Simple average + fixed steps/epoch + fixed frequency | 0.88 | 752 (4 averages over 5 nodes) | 13500 |
| Simple average + adaptive steps/epoch + fixed frequency | 0.84 | 712 (4 averages over 5 nodes) | 4500 |
| Weighted average + adaptive steps/epoch + adaptive frequency | 0.88 | 863 (4 averages over 3 nodes + 1 average over 5 nodes) | 4500 |

FIG. 9

- Quantization (rounding to "1")
  [1.00 0.35 1.48 0.32 -0.50 0.78 -2.33 -0.24] ⟶ [ 1 0 1 0 -1 1 -2 0 ]
- Quantization (rounding to "0.1")
  [1.00 0.35 1.48 0.32 -0.50 0.78 -2.33 -0.24] ⟶ [ 1.0 0.4 1.5 0.3 -0.5 0.8 -2.3 -0.2 ]
- Sparsification (ratio 0.5)
  [1.00 0.35 1.48 0.32 -0.50 0.78 -2.33 -0.24] ⟶ [ 1.00 0 1.48 0 0 0.78 -2.33 0 ]
- Sparsification (ratio 0.625)
  [1.00 0.35 1.48 0.32 -0.50 0.78 -2.33 -0.24] ⟶ [ 1.00 0 1.48 0 0 0.78 -2.33 0 ]
- Non-compression
  [1.00 0.35 1.48 0.32 -0.50 0.78 -2.33 -0.24] ⟶ [ 1.00 0.35 1.48 0.32 -0.50 0.78 -2.33 -0.24 ]

FIG. 10

| Scheme | mAP (Average Precision) | Mean number of bits | Compression time (sec) | Average time (sec) |
|---|---|---|---|---|
| Quantization (rounding to "1" | 0.603 | 16 | 40 | 64 |
| Quantization (rounding to "0.1") | 0.910 | 20 | 41 | 64 |
| Sparsification (ratio 0.5) | 0.645 | 16 | 33 | 63 |
| Sparsification (ratio 0.625) | 0.634 | 20 | 35 | 73 |
| Non-compression | 0.965 | 32 | | 63 |

Similar precision,
~37.5% = {1-(20/32)} * 100%
less communication cost

FIG. 11

SYSTEMS AND METHODS FOR UPDATING MODELS FOR IMAGE PROCESSING USING FEDERATED LEARNING

TECHNICAL FIELD

The present disclosure relates to systems and methods for updating models for image processing using federated learning.

BACKGROUND

In vehicular technologies, such as object detection for vehicle cameras, the distributed learning framework is still under exploration. With the rapidly growing amount of raw data collected at individual vehicles, in the aspect of user privacy, the requirement of wiping out personalized, confidential information and the concern for private data leakage motivate a machine learning model that does not require raw data transmission. In the meantime, raw data transmission to the data center becomes heavier or even infeasible or unnecessary to transmit all raw data. Without sufficient raw data transmitted to the data center due to communication bandwidth constraints or limited storage space, a centralized model cannot be designed in the conventional machine learning paradigm. Federated learning, a distributed machine learning framework, is employed when there are communication constraints and privacy issues. The model training is conducted in a distributed manner under a network of many edge clients and a centralized controller. However, the current federated learning does not consider heterogeneous edge nodes that differ in local dataset size and computation resource.

Accordingly, a need exists for a vehicular network that takes into account heterogeneous edge nodes that differ in local dataset size and computation resource.

SUMMARY

The present disclosure provides systems and methods for updating models for image processing using federated learning.

In one embodiment, a system includes a controller programmed to obtain information about a computation resource in each of a plurality of edge nodes, assign training steps to the plurality of edge nodes based on the information about the computation resource, determine frequencies of uploading local model parameters for the plurality of edge nodes based on the assigned training steps, receive local model parameters from one or more of the plurality of edge nodes based on the determined frequencies, and update a global model based on the received local model parameters.

In another embodiment, a method includes obtaining information about a computation resource in each of a plurality of edge nodes, assigning training steps to the plurality of edge nodes based on the information about the computation resource, determining frequencies of uploading local model parameters for the plurality of edge nodes based on the assigned training steps, receiving local model parameters from one or more of the plurality of edge nodes based on the determined frequencies, and updating a global model based on the received local model parameters.

In another embodiment, a vehicle includes a controller programmed to transmit information about a computation resource of the vehicle to a server, receive a frequency of uploading local model parameters of a model for image processing from the server, upload the local model parameters of the model based on the frequency to the server, receive a global model updated based on the local model parameters of the model from the server, and implement processing of images captured by the vehicle using the received global model.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 8 depicts a table including a cumulative number of training steps implemented by each of the plurality of edge nodes, according to one or more embodiments shown and described herein;

FIG. 9 illustrates a table comparing simulation results of three different schemes of updating a global model;

FIG. 10 illustrates various compression schemes, according to one or more embodiments shown and described herein; and FIG. 11 illustrates simulation results for different compression schemes, according to one or more embodiments show and described herein.

DETAILED DESCRIPTION

The embodiments disclosed herein include systems and methods for updating models for image processing using federated learning. The system obtains information about a computation resource in each of a plurality of edge nodes, assigns training steps to the plurality of edge nodes based on the information about the computation resource, determines frequencies of uploading local model parameters for the plurality of edge nodes based on the assigned training steps, receives local model parameters from one or more of the plurality of edge nodes based on the determined frequencies, and updates a global model based on the received local model parameters.

The present system utilizes a federated learning framework and algorithm that can conduct object detection tasks in a distributed manner with reduced communication cost over a vehicular network with heterogeneous edge nodes. The systems and methods of the present disclosure utilize compression approaches to control the communication cost related to vehicular object detection. In addition, the systems and methods of the present disclosure takes into account networks with heterogeneous edge nodes that differ in local dataset sizes and computation resources. Specifically, the system assigns different weights to local model parameters based on the local dataset sizes of heterogeneous edge nodes. The system also assigns different training steps based on different computation resources of the heterogeneous edge nodes. Based on the assigned training steps, the system determines frequencies of uploading local model parameters for the heterogeneous edge nodes.

Figure 1:
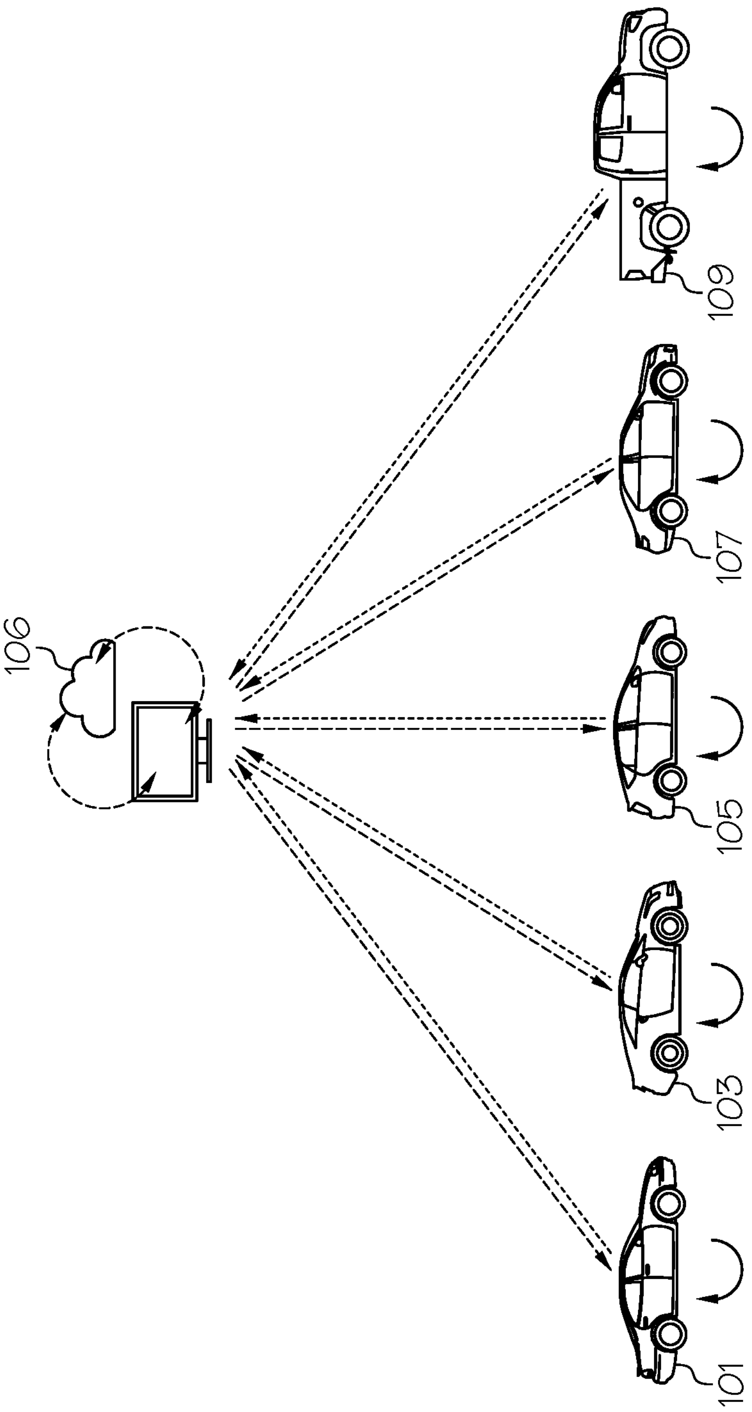
FIG. 1 schematically depicts a system for updating models for image processing using federated learning, in accordance with one or more embodiments shown and described herewith.

FIG. 1 schematically depicts a system for updating models for image processing using federated learning, in accordance with one or more embodiments shown and described herewith.

The system includes a plurality of edge nodes 101, 103, 105, 107, 109, and a server 106. Training for a model is conducted in a distributed manner under a network of the edge nodes 101, 103, 105, 107, and 109 and the server 106. The model may include an image processing model, an object perception model, or any other model that may be utilized by vehicles in operating the vehicles. While FIG. 1 depicts five edge nodes, the system may include more than or less than five edge nodes. Edge nodes 101, 103, 105, 107, 109 may have different datasets and different computing resources.

In embodiments, each of the edge nodes 101, 103, 105, 107, and 109 may be a vehicle, and the server 106 may be a centralized server or an edge server. The vehicle may be an automobile or any other passenger or non-passenger vehicle such as, for example, a terrestrial, aquatic, and/or airborne vehicle. The vehicle is an autonomous vehicle that navigates its environment with limited human input or without human input. In some embodiments, each of the edge nodes 101, 103, 105, 107, and 109 may be an edge server, and the server 106 may be a centralized server. In some embodiments, the edge nodes 101, 103, 105, 107, and 109 are vehicle nodes, and the vehicles may communicate with a centralized server such as the server 106 via an edge server.

In embodiments, the server 106 sends an initialized model to each of the edge nodes 101, 103, 105, 107, 109. The initialized model may be any model that may be utilized for operating a vehicle, for example, an image processing model, an object detection model, or any other model for advanced driver assistance systems. Each of the edge nodes 101, 103, 105, 107, 109 trains the received initialized model using local data to obtain an updated local model and sends the updated local model or parameters of the updated local model back to the server 106. The server 106 collects the updated local models, computes a global model based on the updated local models, and sends the global model to each of the edge nodes 101, 103, 105, 107, 109. Due to communication and privacy issues in vehicular object detection applications, such as dynamic mapping, self-driving, and road status detection, the federated learning framework can be an effective framework for addressing these issues in traditional centralized models.

In embodiments, the server 106 considers heterogeneity of the edge nodes, i.e., different datasets and different computing resources of the edge nodes when computing a global model based on the updated local models. Details about computing a global model based on the updated local models will be described with reference to FIGS. 4-7 below.

Figure 2:
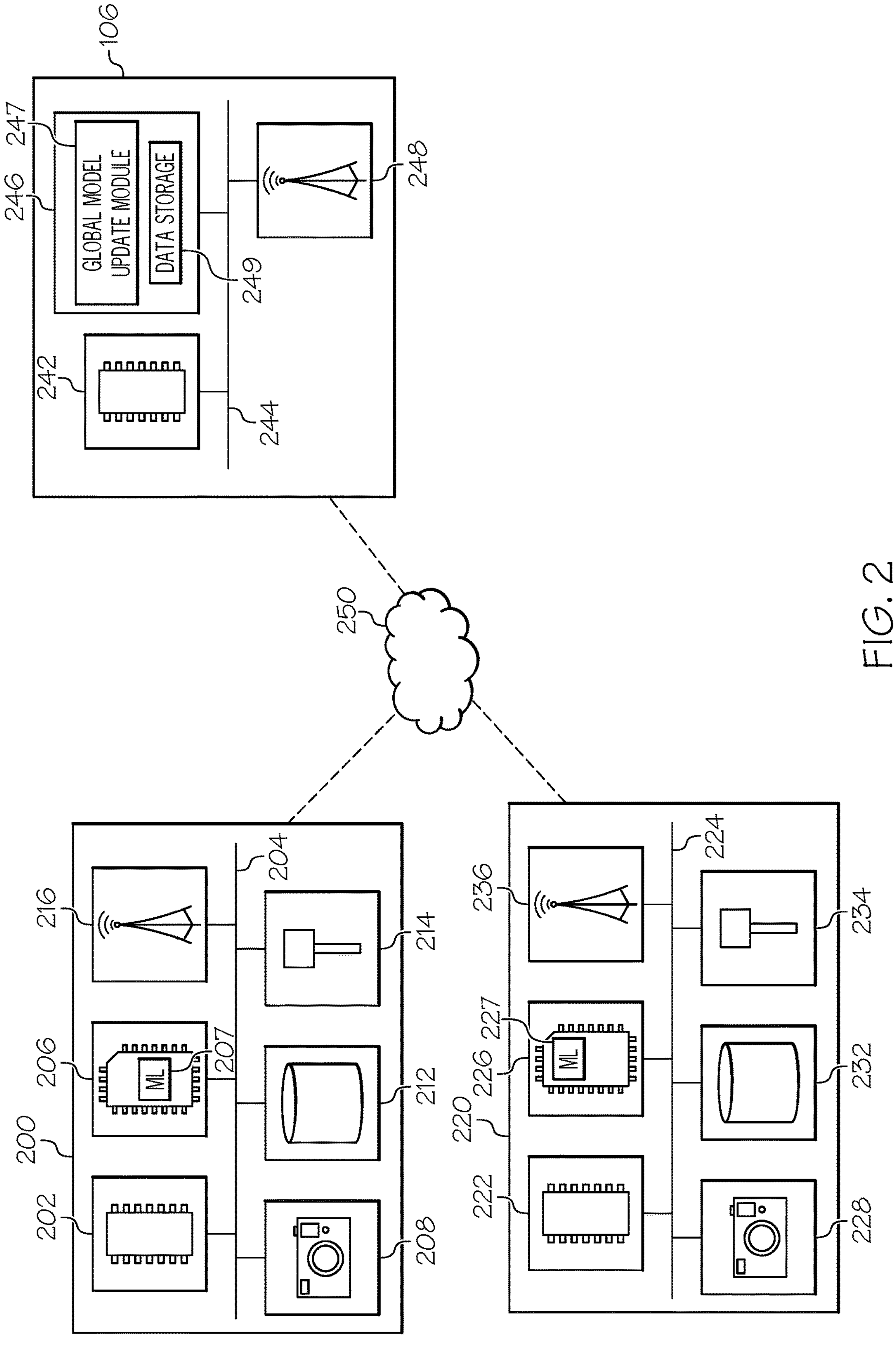
FIG. 2 depicts a schematic diagram of a system for updating models for image processing using federated learning, according to one or more embodiments shown and described herein.

FIG. 2 depicts a schematic diagram of a system for updating models for image processing using federated learning, according to one or more embodiments shown and described herein. The system includes a first edge node system 200, a second edge node system 220, and the server 106. While FIG. 2 depicts two edge node systems, more than two edge node systems may communicate with the server 106.

It is noted that, while the first edge node system 200 and the second edge node system 220 are depicted in isolation, each of the first edge node system 200 and the second edge node system 220 may be included within a vehicle in some embodiments, for example, respectively within two of the edge nodes 101, 103, 105, 107, 109 of FIG. 1. In embodiments in which each of the first edge node system 200 and the second edge node system 220 is included within an edge node, the edge node may be an automobile or any other passenger or non-passenger vehicle such as, for example, a terrestrial, aquatic, and/or airborne vehicle. In some embodiments, the vehicle is an autonomous vehicle that navigates its environment with limited human input or without human input. In some embodiments, the edge node may be an edge server that communicates with a plurality of vehicles in a region and communicates with a centralized server such as the server 106.

The first edge node system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC), and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The first edge node system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more processor 202 along with the one or more memory modules 206 may operate as a controller for the first edge node system 200.

The one or more memory modules 206 includes a machine learning (ML) model training module 207. The ML model training module 207 may train the initial model received from the server 106 using local data obtained by the first edge node system 200, for example, images obtained by imaging sensors. Such a ML model training module may include, but is not limited to, routines, subroutines, programs, objects, components, data structures, and the like for performing specific tasks or executing specific data types as will be described below. The ML model training module 207 obtains parameters of a trained model, which may be transmitted to the server as an updated local model.

Referring still to FIG. 2, the first edge node system 200 comprises one or more sensors 208. The one or more sensors 208 may be any device having an array of sensing devices capable of detecting radiation in an ultraviolet wavelength band, a visible light wavelength band, or an infrared wavelength band. The one or more sensors 208 may have any resolution. In some embodiments, one or more optical components, such as a mirror, fish-eye lens, or any other type of lens may be optically coupled to the one or more sensors 208. In embodiments described herein, the one or more sensors 208 may provide image data to the one or more processors 202 or another component communicatively coupled to the communication path 204. In some embodiments, the one or more sensors 208 may also provide navigation support. That is, data captured by the one or more sensors 208 may be used to autonomously or semi-autonomously navigate a vehicle.

In some embodiments, the one or more sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors for gathering data that could be integrated into or supplement the data collection described herein. Ranging sensors like radar may be used to obtain a rough depth and speed information for the view of the first edge node system 200.

The first edge node system 200 comprises a satellite antenna 214 coupled to the communication path 204 such that the communication path 204 communicatively couples the satellite antenna 214 to other modules of the first edge node system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The first edge node system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of a vehicle, e.g., the edge node 101. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

Still referring to FIG. 2, the first edge node system 200 comprises network interface hardware 216 for communicatively coupling the first edge node system 200 to the second edge node system 220 and/or the server 106. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the first edge node system 200 may transmit its data to the second edge node system 220 or the server 106. For example, the network interface hardware 216 of the first edge node system 200 may transmit vehicle data, location data, updated local model data and the like to the server 106.

The first edge node system 200 may connect with one or more external vehicle systems (e.g., the second edge node system 220) and/or external processing devices (e.g., the server 106) via a direct connection. The direct connection may be a vehicle-to-vehicle connection ("V2V connection"), a vehicle-to-everything connection ("V2X connection"), or a mmWave connection. The V2V or V2X connection or mmWave connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V, V2X, mmWave) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the first edge node system 200 may be communicatively coupled to the server 106 by the network 250. In one embodiment, the network 250 may include one or more computer networks (e.g., a personal area network, a local area network, or a wide area network), cellular networks, satellite networks and/or a global positioning system and combinations thereof. Accordingly, the first edge node system 200 can be communicatively coupled to the network 250 via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the second edge node system 220 includes one or more processors 222, one or more memory modules 226, one or more sensors 228, one or more vehicle sensors 232, a satellite antenna 234, and a communication path 224 communicatively connected to the other components of the second edge node system 220. The components of the second edge node system 220 may be structurally similar to and have similar functions as the corresponding components of the first edge node system 200 (e.g., the one or more processors 222 corresponds to the one or more processors 202, the one or more memory modules 226 corresponds to the one or more memory modules 206, the one or more sensors 228 corresponds to the one or more sensors 208, the one or more vehicle sensors 232 corresponds to the one or more vehicle sensors 212, the satellite antenna 234 corresponds to the satellite antenna 214, the communication path 224 corresponds to the communication path 204), the network interface hardware 236 corresponds to the network interface hardware 216, and the ML model training module 227 corresponds to the ML model training module 207.

Still referring to FIG. 2, the server 106 includes one or more processors 242, one or more memory modules 246, network interface hardware 248, and a communication path 244. The one or more processors 242 may be a controller, an integrated circuit, a microchip, a computer, or any other computing device. The one or more memory modules 246 may comprise RAM, ROM, flash memories, hard drives, or any device capable of storing machine readable and executable instructions such that the machine readable and executable instructions can be accessed by the one or more processors 242. The one or more memory modules 246 may include a global model update module 247 and a data storage 249.

The global model update module 247 updates a global model based on local models received from edge nodes and transmit the updated global model to the edge nodes. Specifically, by referring to FIG. 3, the sever 160 communicates with a first edge node 310 and a second edge node 320. The first edge node 310 and the second edge node 320 may correspond to the first edge node system 200 and the second edge node system 220 in FIG. 2. The first edge node 310 trains its local model using local data such as images 311 for a certain number of steps, e.g., 2,000 steps at step 312. Similarly, the second edge node 320 trains its local model using local data such as images 321 for a certain number of steps, e.g., 2,000 steps at step 322. After the certain number of steps, each of the first edge node 310 and the second edge node 320 compresses parameters of the trained local model and transmits the compressed parameters to the server 160. The global model update module 247 of the server 160 averages the compressed parameters received from the first edge node 310 and the second edge node 320 to obtain average parameters for an updated global model at step 332. The server 160 transmits the average parameters to each of the first edge node 310 and the second edge node 320.

Then, each of the first edge node 310 and the second edge node 320 repeats local training using the received average parameters. Specifically, the first edge node 310 trains its local model incorporating the received average parameters using local data for another 2,000 steps at step 314. Similarly, the second edge node 320 trains its local model incorporating the received average parameters using local data for another 2,000 steps at step 324. Then, each of the first edge node 310 and the second edge node 320 compresses parameters of the trained local model and transmits the compressed parameters to the server 160. The global model update module 247 of the server 160 averages the compressed parameters received from the first edge node 310 and the second edge node 320 to obtain average parameters for an updated global model at step 334. The server 160 transmits the average parameters to each of the first edge node 310 and the second edge node 320. Each of the first edge node 310 and the second edge node 320 trains its local model at steps 316 and 326, respectively. The first edge node 310 may infer objects in a captured image using its updated local model at step 318. Similarly, the second edge node 320 may infer objects in a captured image using it updated local model at step 328.

Figure 3:
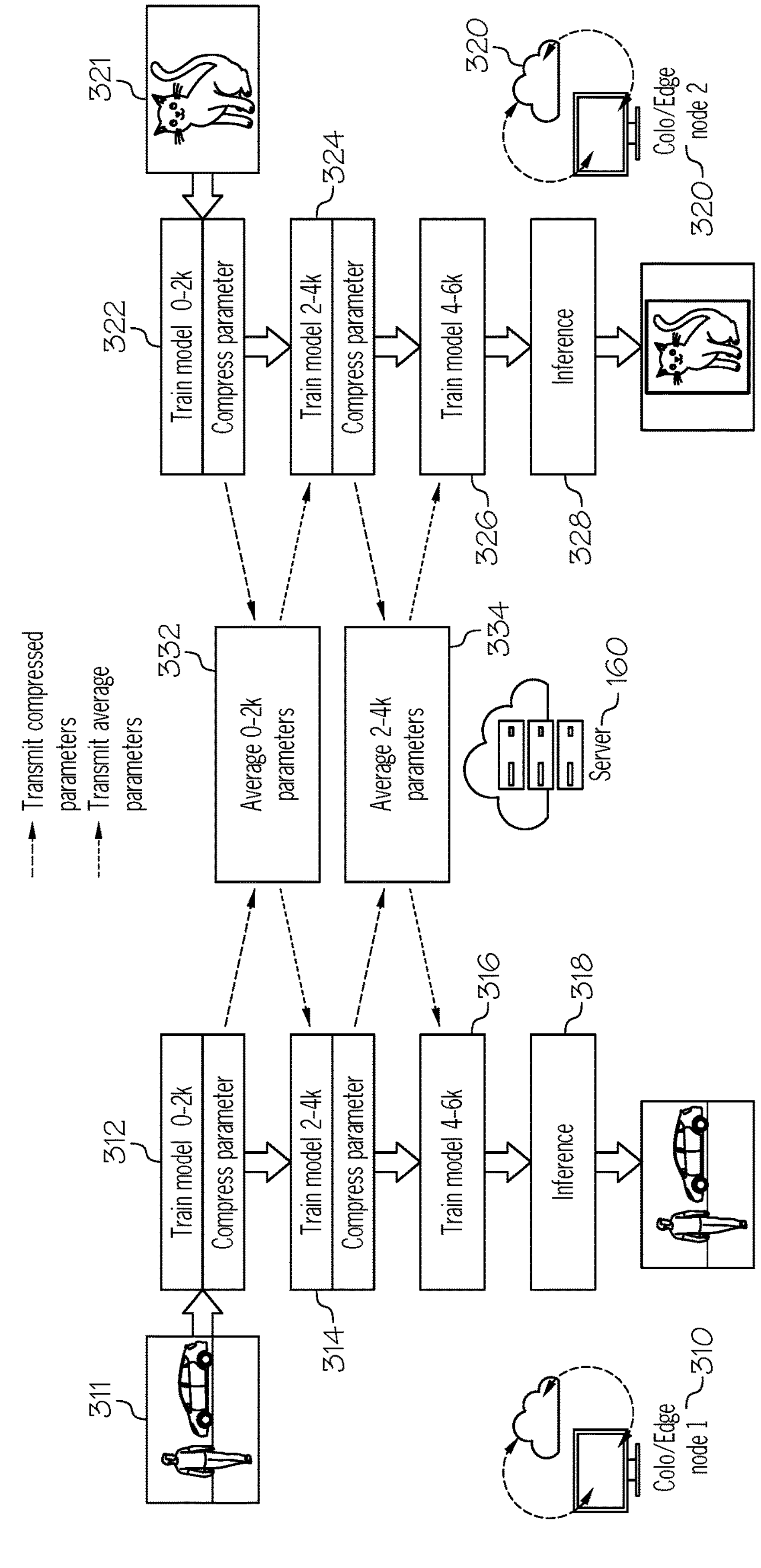
FIG. 3 depicts a schematic diagram for updating and communicating a global model among a server and edge nodes, according to one or more embodiments shown and described herein.

While FIG. 3 depicts that the frequencies of uploading the compressing data by the first edge node 310 and the second edge node 320 are the same, the frequencies may be different based on different computing resources of the first edge node 310 and the second edge node 320. Details of differing frequencies will be described below with reference to FIGS. 4, 6, and 7.

Regarding averaging parameters of updated local models, the server 160 may give different weights to different local models based on the amount of dataset that each of the first edge node 310 and the second edge node 320 retains. Details of differing frequencies will be described below with reference to FIGS. 4 and 5.

Figure 4:
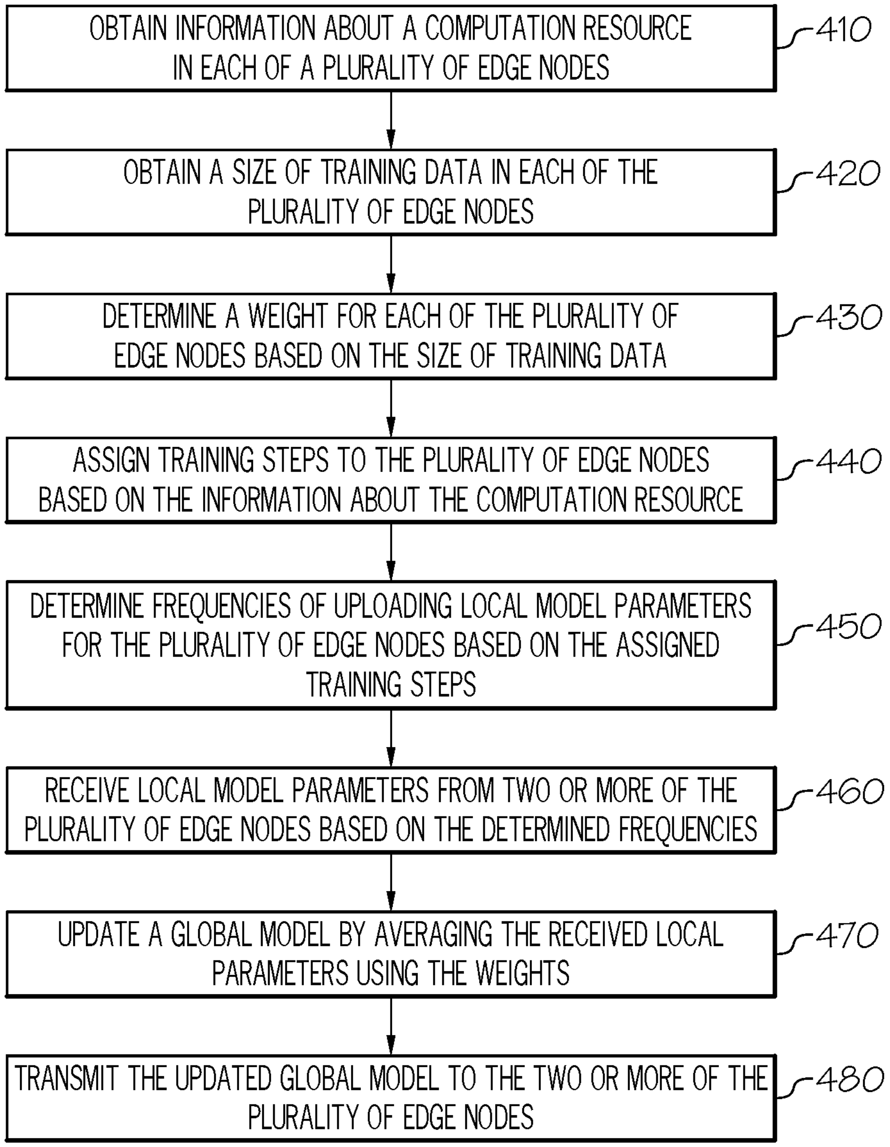
FIG. 4 depicts a flowchart for updating models for image processing using federated learning, according to one or more embodiments shown and described herein.
Figure 5:
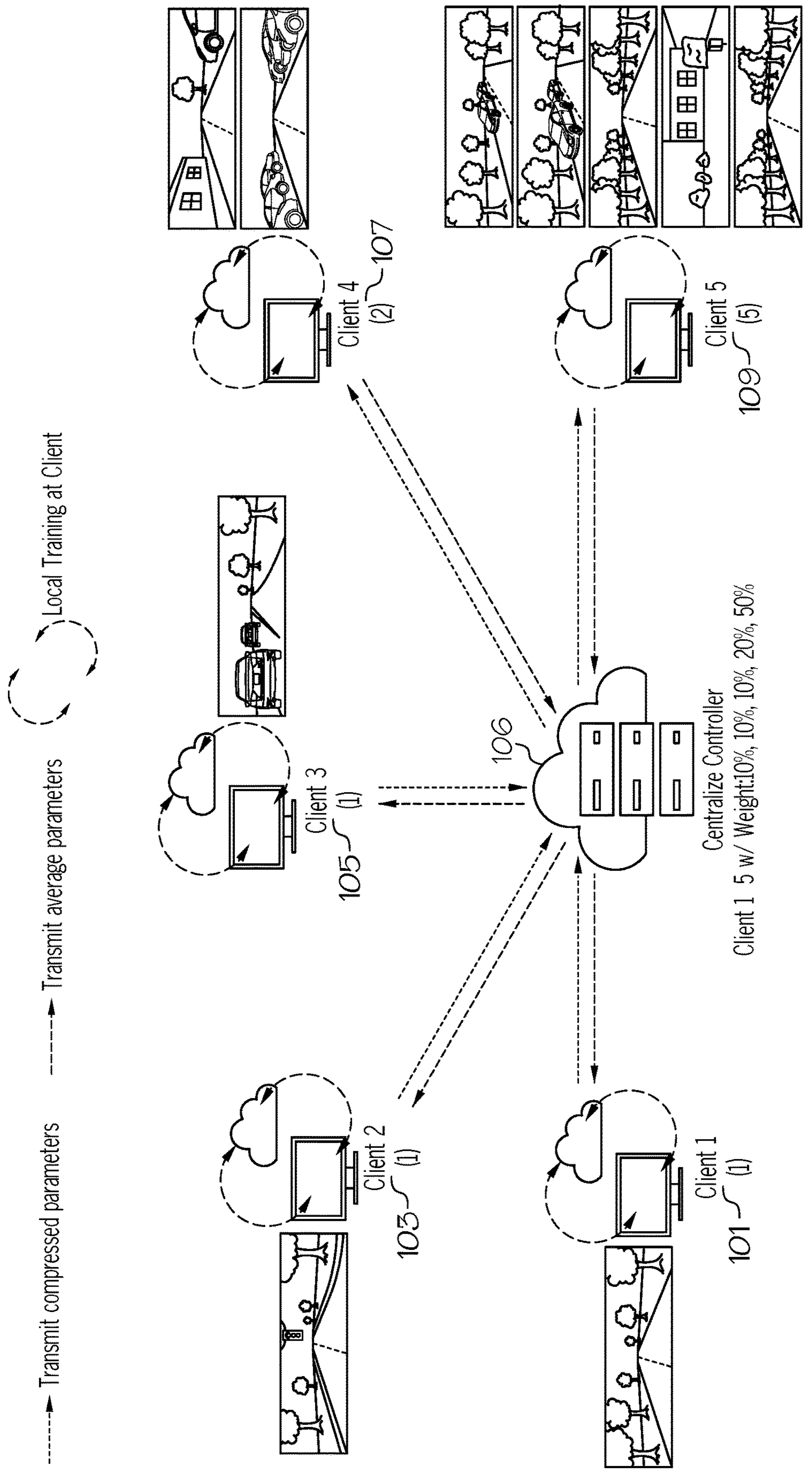
FIG. 5 depicts assigning weights to edge nodes based on the sizes of datasets of the edge nodes, according to one or more embodiments shown and described herein.
Figure 6:
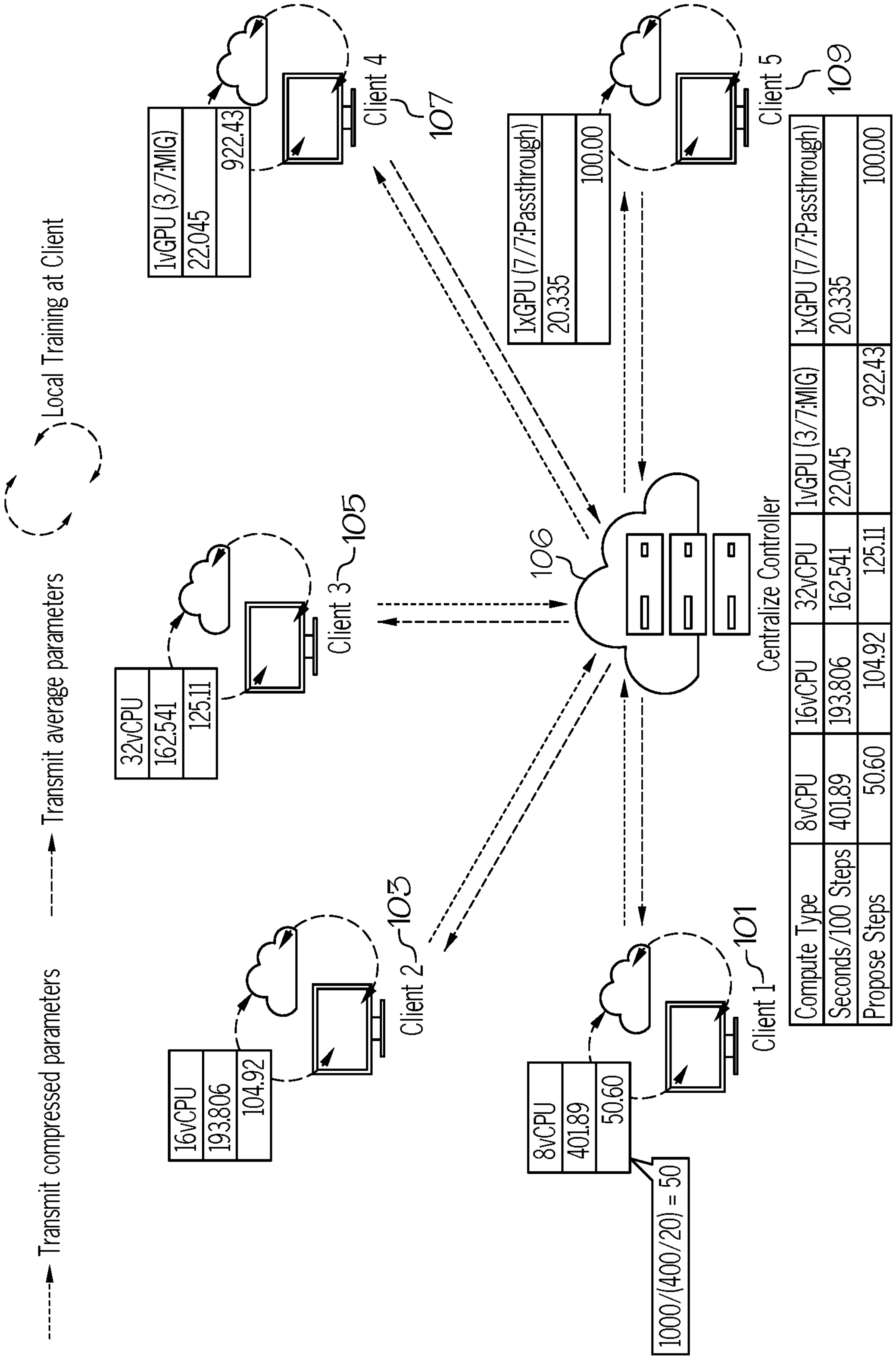
FIG. 6 depicts assigning training steps to a plurality of edge nodes based on information about the computation resources of the edge nodes, according to one or more embodiments shown and described herein.
Figure 7:
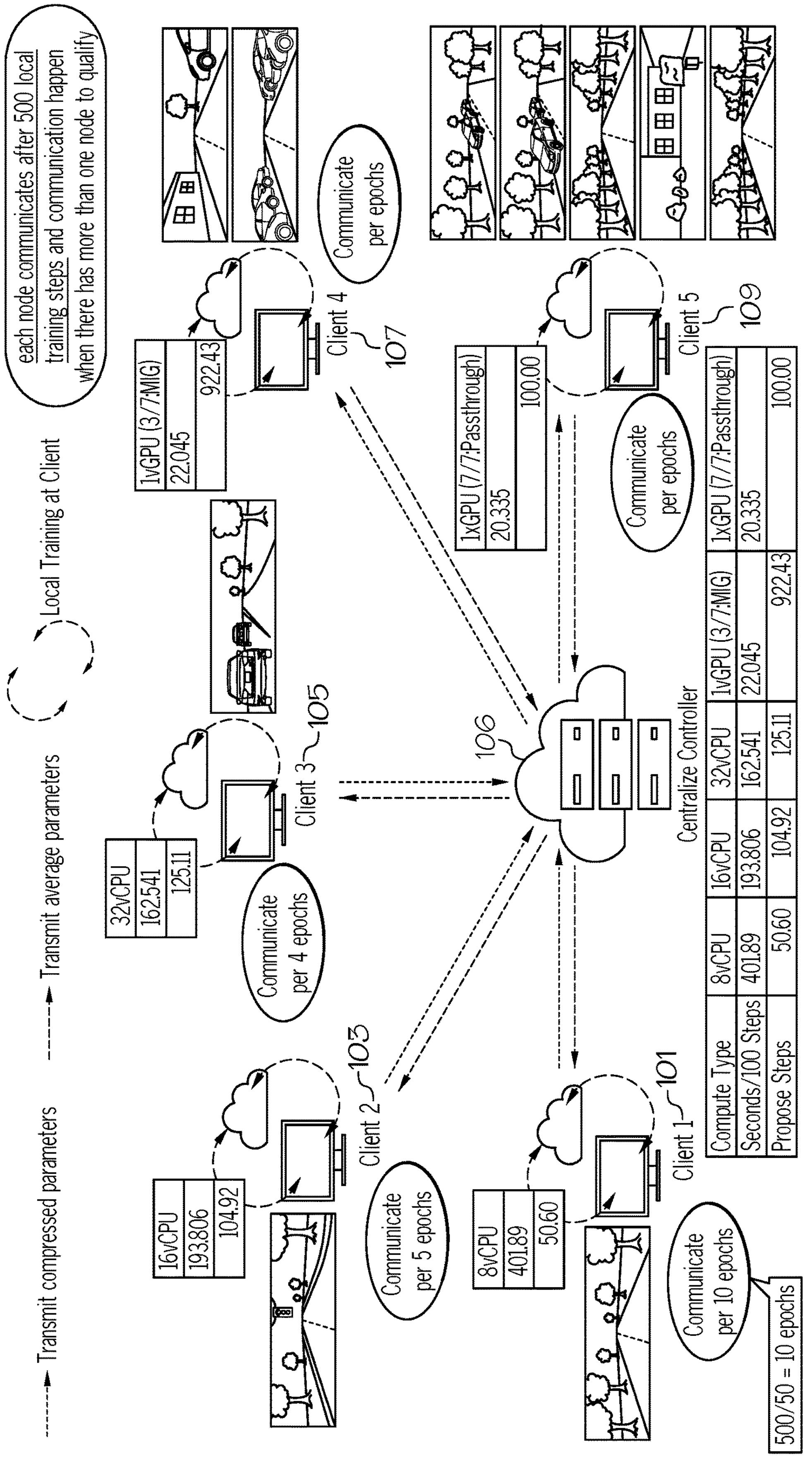
FIG. 7 depicts assigning frequencies of uploading local model parameters for a plurality of edge nodes based on the assigned training steps in FIG. 6, according to one or more embodiments shown and described herein.

FIG. 4 depicts a flowchart for updating models for image processing using federated learning, according to one or more embodiments shown and described herein. The flowchart is described with reference to FIGS. 5-7.

In step 410, a server obtains information about a computation resource in each of a plurality of edge nodes. In embodiments, by referring to FIG. 6, the server 160 obtains information about a computation resource in each of a plurality of edge nodes 101, 103, 105, 107, 109. The computation resource may be a computing power of a CPU or a GPU. The edge nodes 101, 103, 105, 107, 109 have different computation resources. For example, the edge node 101 has 8vCPU, the edge node 103 includes 16vCPU, the edge node 105 includes 32vCPU, the edge node 107 includes 1vGPU, and the edge node 109 includes 1xGPU.

Referring back to FIG. 4, in step 420, the server obtains a size of training data in each of the plurality of edge nodes. In embodiments, by referring to FIG. 5, the server 160 obtains the size of training data in each of the plurality of edge nodes 101, 103, 105, 107, 109. For example, the size of training data for the edge node 101 is the same as the one for edge nodes 103 and 105. However, the size of training data for the edge node 107 is two times greater than the size of training data for the edge node 101. The size of training data for the edge node 109 is five times greater than the size for the edge node 101.

Referring back to FIG. 4, in step 430, the server determines a weight for each of the plurality of edge nodes based on the size of training data. By referring to FIG. 5, the ratio of the sizes of training data among the edge nodes 101, 103, 105, 107, 109 is 1:1:1:2:5. In this regard, the server may assign weights of 10%, 10%, 10%, 20%, 50% to the edge nodes 101, 103, 105, 107, 109, respectively.

Referring back to FIG. 4, in step 440, the server assigns training steps to the plurality of edge nodes based on the information about the computation resource. By referring to FIG. 6, the server 160 determines a time for implementing a predetermined number of training steps in each of the plurality of edge nodes based on the information about the computation resource. For example, for the edge node 101 having 8vCPU, it takes 401.89 seconds for implementing 100 steps of training. For the edge node 103 having 16vCPU, it takes 193.806 seconds for implementing 100 steps of training. For the edge node 105 having 32vCPU, it takes 162.541 seconds for implementing 100 steps of training. For the edge node 107 having 1vGPU, it takes 22.045 seconds for implementing 100 steps of training. For the edge node 109 having 1xGPU, it takes 20.335 seconds for implementing 100 steps of training.

The server 106 assigns training steps per epoch to the plurality of edge nodes 101, 103, 105, 107, 109 based on the times for implementing the predetermined number of training steps. For example, the server 106 assigns 1,000 training steps per epoch to the edge node 109. Setting the 1,000 steps for the edge node 109 as a reference, the server 106 assigns training steps to other edge nodes. Specifically, the server 106 assigns 50.60 training steps per epoch to the edge node 101 given the fact that it takes 401.89 seconds for the edge node 101 to implement 100 steps. The server 106 assigns 104.92 training steps per epoch to the edge node 103 given the fact that it takes 193.806 seconds for the edge node 103 to implement 100 steps. The server 106 assigns 125.11 training steps per epoch to the edge node 105 given the fact that it takes 162.541 seconds for the edge node 105 to implement 100 steps. The server 106 assigns 922.43 training steps per epoch to the edge node 107 given the fact that it takes 22.045 seconds for the edge node 107 to implement 100 steps.

Referring back to FIG. 4, in step 450, the server determines frequencies of uploading local model parameters for the plurality of edge nodes based on the assigned training steps. By referring to FIG. 7, in embodiments, the server 160 determines the frequencies of uploading the local model parameters for the plurality of edge nodes 101, 103, 105, 107, 109 based on the assigned training steps per epoch and a training step threshold. The assigned training steps are determined in step 440. In this example, the training step threshold may be 500 steps. That is, each edge node communicates with the server 160 after 500 locating training steps. Communications from the server 160 to edge nodes happen only when the server 160 receives local model parameters from more than one edge node. In this example, the edge node 101 uploads its local model parameters to the server 160 every 10 epochs because the edge node 101 trains 50.60 steps per epoch and it would take 10 epochs for the edge node 101 to train more than the training step threshold (i.e., 500 steps). The edge node 103 uploads its local model parameters to the server 160 every 5 epochs because the edge node 103 trains 104.92 steps per epoch and it would take 5 epochs for the edge node 103 to train more than the training step threshold (i.e., 500 steps). The edge node 105 uploads its local model parameters to the server 160 every 4 epochs because the edge node 105 trains 125.11 steps per epoch and it would take 4 epochs for the edge node 105 to train more than the training step threshold (i.e., 500 steps). The edge node 107 uploads its local model parameters to the server 160 every single epoch because the edge node 107 trains 922.43 steps per epoch and the edge node 107 trains more than the training step threshold (i.e., 500 steps) within one epoch. The edge node 109 uploads its local model parameters to the server 160 every single epoch because the edge node 109 trains 1000 steps per epoch and the edge node 109 trains more than the training step threshold (i.e., 500 steps) within one epoch.

Referring back to FIG. 4, in step 460, the server receives local model parameters from two or more of the plurality of edge nodes based on the determined frequencies. For example, by referring to FIG. 7, during the first epoch, the server 160 receives local model parameters from the edge node 107 and the edge node 109. The server 160 does not receive local model parameters from the edge nodes 101, 103, 105 because the edge node 101 communicates with the server 160 every 10 epochs, the edge node 103 communicates with the server 160 every 5 epochs, and the edge node 105 communicates with the server 160 every 4 epochs.

Referring back to FIG. 4, in step 470, the server updates a global model by averaging the received local parameters using the weights determined in step 430. For example, by referring to FIG. 7, during the first epoch, the server 160 receives local model parameters from the edge node 107 and the edge node 109. The weights assigned to the edge node 107 and the edge node 109 are 20% and 50%, respectively. Thus, the server 160 may update a global model by averaging the local parameters from the edge node 107 and the local parameters from the edge node 109 using the weight ratio of 2:5.

In embodiments, the server 160 may determine whether local model parameters from two or more edge nodes are received during a single epoch. Then, in response determining that local model parameters from two or more edge nodes are received during the single epoch, the server 160 updates the global model based on the local model parameters received from the two or more edge nodes. If the server received local model parameters from less than two edge nodes, the server 160 does not update a global model and holds transmitting parameters of the global model to any of the edge nodes, which saves transmission resources. For example, by referring to FIG. 8, a table describes a cumulative number of training steps implemented by each of the plurality of edge nodes 101, 103, 105, 107, 109. Specifically, the first row includes the number of training steps by each of the edge nodes 101, 103, 105, 107, 109 during the first epoch. In this example, a training step threshold for transmitting local model parameters to the server 160 is 1,000 steps. Thus, during the first epoch, only the edge node 105 meets the training step threshold. Because only one edge node 105 transmits its local model parameters to the server 160, the server 160 does not update a global model and holds transmitting parameters of the global model to any of the edge nodes.

The second row includes the cumulative number of training steps by each of the edge nodes 101, 103, 105, 107, 109 up to the second epoch. During the second epoch, the edge nodes 103, 105, and 109 meet the training step threshold and transmit their local model parameters to the server 160. The server 160 then average the local model parameters received from the edge nodes 103, 105, and 109 using weights assigned to the edge nodes 103, 105, and 109. As described above, the weights assigned to the edge nodes 103, 105, and 109 are determined based on the sizes of datasets in the edge nodes 103, 105, and 109.

The third row includes the cumulative number of training steps by each of the edge nodes 101, 103, 105, 107, 109 up to the third epoch. During the third epoch, the edge nodes 101, 105, and 107 meet the training step threshold and transmit their local model parameters to the server 160. The server 160 then average the local model parameters received from the edge nodes 101, 105, and 107 using weights assigned to the edge nodes 101, 105, and 107. This process repeats every epoch. In FIG. 8, underlined training steps indicate that corresponding edge nodes communicate their local model parameters to the server 160 and receive a global model that averages the local model parameters.

In step 480, the server transmits the updated global model to the two or more of the plurality of edge nodes. In embodiments, the server 160 transmit the updated global model obtained in step 470 to the edge nodes. For example, by referring to FIG. 7, the server 160 updates a global model by averaging the local parameters from the edge node 107 and the local parameters from the edge node 109 using the weight ratio of 2:5 during the first epoch, and transmits the updated global model to the edge nodes 107 and 109. As another example, by referring to FIG. 8, during the first epoch, the server 160 does not transmit its global model to any of the edge nodes. During the second epoch, the server 160 updates a global model by averaging the local model parameters received from the edge nodes 103, 105, and 109 using weights assigned to the edge nodes 103, 105, and 109, and transmits the updated global model to the edge nodes 103, 105, and 109.

FIG. 9 illustrates a table comparing simulation results of three different schemes of updating a global model.

Three schemes include (1) simple average+fixed steps/epoch+fixed frequency; (2) simple average+adaptive steps/epoch+fixed frequency; and (3) weighted average+adaptive steps/epoch+adaptive frequency. The weighted average is described above with reference to FIG. 5. The adaptive steps/epoch is described above with reference to FIG. 6. The adaptive frequency is described above with reference to FIG. 7. Mean average precision (mAP) for the first scheme is the same as mAP for the third scheme. However, the third scheme according to the present disclosure reduces the total training time of the first scheme by 66 percent. That is, the training method and system according to the present disclosure reduce the total training time without sacrificing precision.

FIG. 10 illustrates various compression schemes, according to one or more embodiments shown and described herein. In embodiments, the edge nodes may compress parameters for a local model using one of the compression schemes illustrated in FIG. 10.

Here, four compression schemes and a non-compression scheme are compared. The four compression schemes contain two quantization schemes and two sparsification schemes. The first quantization scheme, quantization (rounding to "1"), rounds each value of the parameters in the checkpoint file to an integer. The second quantization scheme, quantization (rounding to "0.1"), rounds each value of the parameters in the checkpoint file to 1-digit decimal number. The first sparsification scheme is sparsification with a ratio of 0.5. It zeros out 50% of entries according to the magnitude and only preserves entries with more extensive magnitude parameters. The second sparsification scheme is sparsification with a ratio of 0.625. It zeros out 37.5% entries according to the magnitude. However, the non-compression scheme does not include any post-process over the checkpoint files from local models and directly sends them to the centralized controller for averaging.

FIG. 11 illustrates simulation results for different compression schemes, according to one or more embodiments show and described herein. The scheme of quantization of rounding to 0.1 shows the highest mAP among the schemes.

The table in FIG. 11 includes four numerical metrics: mean average precision, the mean number of bits, compression time, and average time. Mean average precision is a numerical metric to measure how precise an object detection algorithm is. A mean average precision for each image in the dataset is calculated and then average over the whole testing dataset is calculated. A mean number of bits is utilized to measure the computation cost and computed using the expected number of bits used to represent the compressed parameters divided by a total number of parameters. This can be pre-computed, and the values for the compression and non-compression schemes are 16 for quantization (rounding to "1"), 20 for quantization (rounding to "0.1"), 16 for sparsification (ratio 0.5), 20 for sparsification (ratio 0.625), 32 for non-compression. Compression time is to measure how many seconds are utilized for the local compression step. Finally, the average time measures how many seconds are utilized for the global averaging at the centralized controller. The quantization (rounding to "0.1") according to the present disclosure achieves similar object detection performance with the non-compression scheme while reducing 37.5% communication cost.

It should be understood that embodiments described herein are directed to a system for updating models for image processing. The system includes a controller programmed to: obtain information about a computation resource in each of a plurality of edge nodes, assign training steps to the plurality of edge nodes based on the information about the computation resource, determine frequencies of uploading local model parameters for the plurality of edge nodes based on the assigned training steps, receive local model parameters from one or more of the plurality of edge nodes based on the determined frequencies, and update a global model based on the received local model parameters.

The present methods and systems for updating models using federated learning provides several advantages over conventional schemes. First, to address the heterogeneity of local dataset sizes, the present disclosure utilizes weighted averaging of local parameters at a centralized server. The weight for each edge node is proportional to the local training data size. Since the edge nodes with more training images are more likely to train a precise object detection model, the server will rely on them and assign more weights to these local models. This design accelerates the training process and convergence towards a high precise model than a simple average.

Second, regarding the heterogeneity of local computation resources, the present disclosure sets the local training steps adaptive to the local computation power at each training epoch. At the end of each training epoch, edge nodes in the network may send local updated model parameters to the server. Then, with the adaptive training step number strategy, each edge node can make the best use of local computation resources and train local models as precisely as possible within the epoch. Unlike conventional frameworks, where each edge node trains the same number of steps in one epoch, the present scheme helps avoid local waiting time and guarantees that edge nodes communicate the sufficiently precise local model to the server.

Third, the present federated learning algorithm reduced communication costs by transmitting compressed model parameters over the network with heterogeneous edge nodes. The edge nodes differ in locally stored data size and computation resources. Since the local model in an edge node is a deep neural network model with millions of parameters, applying a quantization scheme to the model parameters before transmission significantly decreases the communication cost. Specifically, rounding each parameter value to a 1-digit decimal number reduces the communication cost by 37.5% while preserving the model precision.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
a controller programmed to:
communicate with a plurality of edge nodes, wherein the plurality of edge nodes are associated with a plurality of vehicles, and wherein the plurality of edge nodes comprise heterogenous edge nodes that differ in local data set size and computation resources;
for at least one edge node of the plurality of edge nodes:
obtain information about a computation resource of the at least one edge node, wherein the computation resources corresponds to a power of at least one of a central processing unit or a graphical processing unit, and wherein the information about the computation resource indicates an amount of time the at least one edge node takes to implement a predetermined number of training steps;

assign the at least one edge node a number of training steps based on the information about the computation resource;
set at least one upload frequency for the at least one edge node to upload local model parameters based on the assigned training steps and a training step threshold, wherein the at least one upload frequency is associated with a number of epochs;
receive local model parameters from the at least one edge node based on the at least one upload frequency; and
update a global model based on the local model parameters.

2. The system of claim 1, wherein the controller is further programmed to:
obtain a size of training data in the at least one edge node;
determine a weight for the at least one edge node based on the size of training data; and
update the global model by averaging the received local parameters using the weights.

3. The system of claim 1, wherein the at least one upload frequency comprises a first upload frequency for a first edge node of the at least one edge node and a second upload frequency for a second edge node of the at least one edge node.

4. The system of claim 1, wherein the controller is further programmed to transmit parameters of the updated global model to the at least one edge node.

5. The system of claim 1, wherein the controller is further programmed to
determine whether local model parameters from two or more edge nodes of the at least one edge node are received during a single epoch; and
in response determining that local model parameters from the two or more edge nodes are received during the single epoch:
update the global model based on the local model parameters received from the two or more edge nodes; and
transmit parameters of the updated global model to the two or more edge nodes.

6. The system of claim 1, wherein the controller is further programmed to:
determine whether local model parameters from two or more edge nodes of the at least one edge node are received during a single epoch; and
in response to determining that local model parameters from less than two edge nodes are received during the single epoch, hold transmitting parameters of the global model to any of the plurality of edge nodes.

7. The system of claim 1, wherein the plurality of edge nodes include at least one of a connected vehicle or an edge server.

8. The system of claim 1, wherein the local model parameters received from the at least one edge node are compressed parameters.

9. A method comprising:
connecting to a plurality of edge nodes, wherein the plurality of edge nodes are associated with a plurality of vehicles, and wherein the plurality of edge nodes comprise heterogenous edge nodes that differ in local data set size and computation resources;
for at least one edge node of the plurality of edge nodes:
obtaining information about a computation resource of the at least one edge node, wherein the computation resources corresponds to a power of at least one of a central processing unit or a graphical processing unit, and wherein the information about the computation resource indicates an amount of time the at least one edge node takes to implement a predetermined number of training steps;

assigning the at least one edge node a number of training steps based on the information about the computation resource;

setting at least one upload frequency uploading local model parameters for the at least one edge node based on the assigned training steps and a training step threshold, wherein the at least one upload frequency is associated with a number of epochs;

receiving local model parameters from the at least one edge node based on the at least one upload frequency; and updating a global model based on the local model parameters.

10. The method of claim 9, further comprising:

obtaining a size of training data in the at least one edge node;

determining a weight for the at least one edge node based on the size of training data; and updating the global model by averaging the local parameters using the weights.

11. The method of claim 9, wherein the at least one upload frequency comprises a first upload frequency for a first edge node of the at least one edge node and a second upload frequency for a second edge node of the at least one edge node.

12. The method of claim 9, further comprising transmitting parameters of the updated global model to the at least one edge node.

13. The method of claim 9, further comprising:

determining whether local model parameters from two or more edge nodes of the at least one edge node are received during a single epoch; and in response determining that local model parameters from the two or more edge nodes are received during the single epoch:

updating the global model based on the local model parameters received from the two or more edge nodes; and transmitting parameters of the updated global model to the two or more edge nodes.

14. The method of claim 9, further comprising:

determining whether local model parameters from two or more edge nodes of the at least one edge node are received during a single epoch; and in response determining that local model parameters from less than two edge nodes are received during the single epoch, holding transmitting parameters of the global model to any of the plurality of edge nodes.

15. A vehicle comprising:

a controller programmed to:

transmit information about a computation resource of the vehicle to a server wherein the computation resource corresponds to a power of at least one of a central processing unit or a graphical processing unit, wherein the information about the computation resource indicates an amount of time the vehicle takes to implement a predetermined number of training steps, and wherein the server assigns the vehicle a number of training steps to implement per epoch based on the information about the computation resource;

receive a set frequency of uploading local model parameters of a model for image processing from the server, wherein the set frequency is based on the assigned training steps and a training step threshold, and wherein the frequency is associated with a number of epochs;

upload the local model parameters of the model based on the frequency to the server;

receive a global model updated based on the local model parameters of the model from the server; and implement processing of images captured by the vehicle using the received global model.

16. The vehicle of claim 15, wherein the controller is programmed to:

compress the local model parameters of the model; and upload the compressed local model parameters to the server.

17. The vehicle of claim 16, wherein the controller is programmed to:

compress the local model parameters of the model using quantization or sparsification.

18. The vehicle of claim 15, wherein the controller is programmed to:

transmit a size of training data in the vehicle to the server; and receive a global model updated based on the local model parameters of the model and the size of training data from the server.

* * * * *